United States Patent Office 3,767,768
Patented Oct. 23, 1973

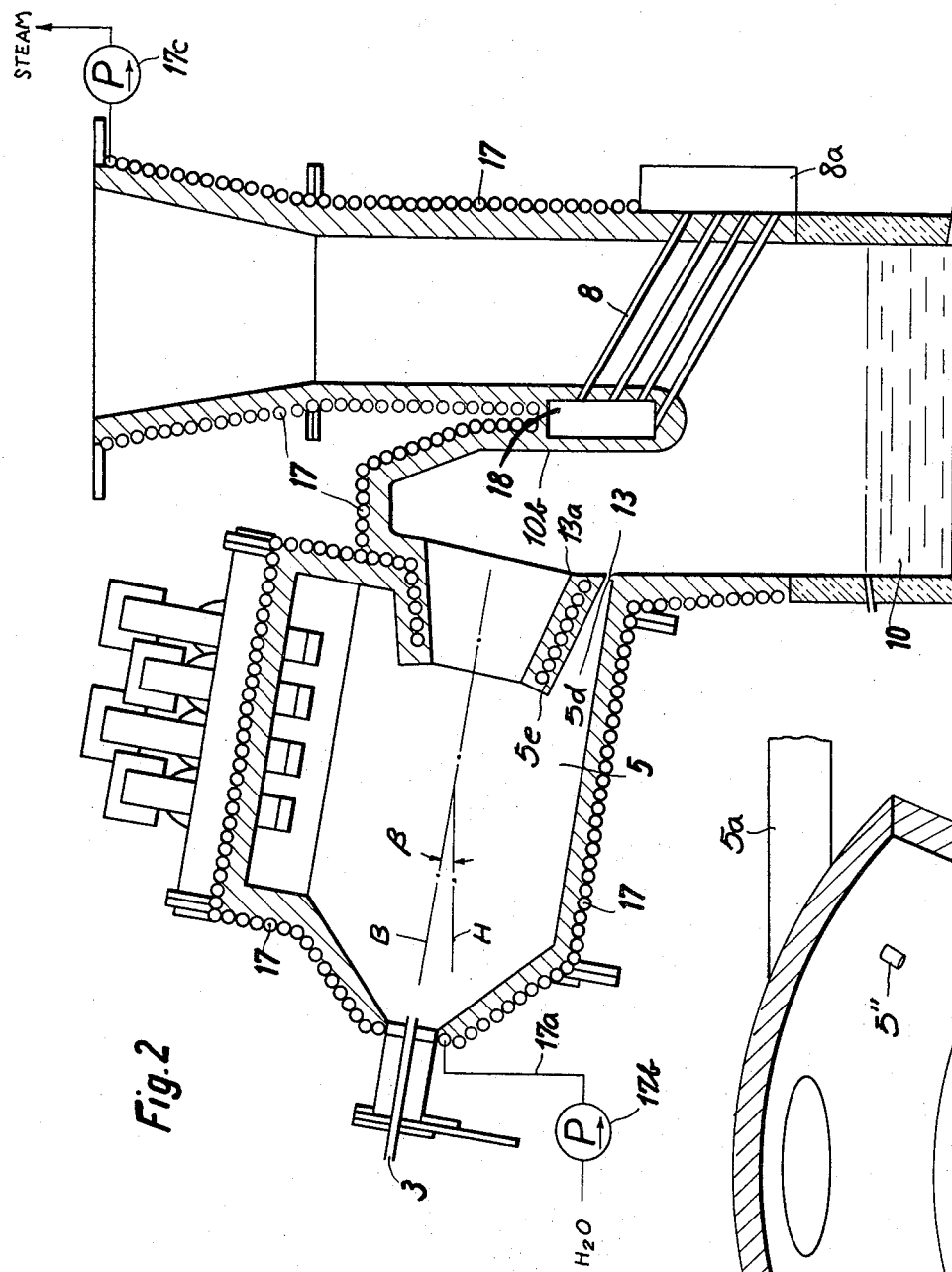

3,767,768
PROCESS FOR RECOVERING PHOSPHORUS
COMPOUNDS
Lothar Reh, Bergen-Enkheim, and Carl-August Maelzer, Frankfurt am Main, Germany, assignors to Metallgesellschaft A.G., Frankfurt am Main, and Deutsche Babcock & Wilcox A.G., Oberhausen, Germany
Filed Feb. 25, 1972, Ser. No. 229,280
Claims priority, application Germany, Feb. 27, 1971,
P 21 09 350.5
Int. Cl. C01b 25/12
U.S. Cl. 423—304                                  12 Claims

ABSTRACT OF THE DISCLOSURE

A process for obtaining phosphorus compounds, especially phosphorus pentoxide, wherein the crude phosphorus-containing substances are introduced tangentially or along a secant into a cyclone furnace together with oxygen-containing gas, silicon-containing and carbon-containing materials to react and form the phosphorus pentoxide. The reaction is carried out at a temperature of at least 1500° C. while the wall of the cyclone is cooled by evaporation of water against a pressure of at least 20 kg./cm.$^2$ above atmospheric so that a protective continuously renewing film is formed along the cyclone wall.

(1) CROSS-REFERENCE TO RELATED APPLICATION

The present application is related to our copending application Ser. No. 11,107 filed Feb. 13, 1970, now abandoned, and commonly assigned with the present case, said copending application dealing with a process for the pyrometallurgical treatment of sulfuric iron ores and ion-ore concentrates.

(2) FIELD OF THE INVENTION

Our present invention relates to the production of phosphorus compounds and, more particularly, the production of phosphorus pentoxide or compounds made therefrom. More particularly, the invention relates to a process for producing phosphorus pentoxide from other phosphorus-containing materials, especially raw phosphates or phosphorus-containing slags.

(3) BACKGROUND OF THE INVENTION

The importance of obtaining certain phosphorus compounds of considerable utility in the fertilizer and chemical industries, from phosphorus-containing raw materials, has grown in recent years as the number of processes have increased. For example, the conversion of phosphorus-containing natural minerals such as fluorapatite or chlorapatite to phosphoric acid, elemental phosphorus or phosphorus oxide and fertilizer phosphates may make use of a reaction between the crude phosphorus-containing materials, carbonaceous materials and siliceous materials in an upright furnace of varied configurations and heated by various means including carbonaceous electrodes. Phosphoric acid may also be recovered by wet processing using treatments of the phosphorus-containing materials with sulfuric acid or hydrochloric acid. Other acid treatments may be used to produce superphosphates or mixed phosphates for fertilizer processes, and fused-bath techniques may be employed to recover phosphorus-containing salts. All these systems, including those which involve a burning of elemental phosphorus to produce phosphorus pentoxide ($P_2O_5$) are relatively expensive, complex and incapable of satisfactory control. Unnecessary steps, such as the production of elemental phosphorus and the burning thereof, may be required when the desired product is phosphorus pentoxide and furnace systems of the conventional type generally involve high expenditure for fuel and equipment having high capital and operating costs.

(4) OBJECTS OF THE INVENTION

It is, therefore, the principal object of the present invention to provide an improved process for the production of phosphorus compounds, using phosphorus-containing minerals, slags and other raw materials as the starting point, which is more economical and more efficient than earlier systems.

A more specific object of the invention is to provide an improved process for producing phosphorus pentoxide from raw materials containing phosphorus.

Another object of the invention is to provide a process for producing phosphorus pentoxide which is readily controlled, has a low fuel cost, and may make use of relatively compact and inexpensive equipment.

Yet another object of the invention is the provision of an improved method of operating a phosphorus pentoxide plant.

(5) SUMMARY OF THE INVENTION

These objects are attained, in accordance with the present invention, which provides a process for producing phosphorus compounds, especially phosphorus pentoxide, by a thermal solubilization of raw phosphates (phosphate minerals) or phosphorus-containing metallurgical slags) in the presence of siliceous and carbonaceous substances, the process being carried out under certain critical conditions which have been found to qualitatively increase the yield, efficiency and economy of the process. We have found, more specifically, that it is essential to carry out the reaction at a temperature of at least 1500° C. and in such manner that all or some of the reactants are introduced generally tangentially or along a secant to a cyclone chamber having a substantially recumbent axis and whose walls are cooled by evaporation of water against a pressure of at least 20 kg./cm.$^2$ above atmospheric. The latter provision is required to enable the generation of a generally continuous protective film along the wall of the cyclone chamber, which is not maintained if the latter has other than a substantially recumbent axis, the film playing a critical role in improving the reaction conditions as indicated above. It appears that a large part of the reaction takes place in or is controlled by the film along the walls or the kinetics at the gas/film interphase or any solid/film interphase created in the chamber. The term "substantially recumbent axis" is used herein to define a cyclone axis which is either horizontal or tilted slightly to the horizontal, preferably downwardly in the direction of the mouth of the cyclone chamber, at an angle which may range up to 30° and is preferably less than 15°. Since the axis can be horizontal, the angle included between the recumbent axis of the cyclone and the horizontal may be 0 to 30° but is preferably 0 to 15°.

The importance of cooling the wall of the cyclone by indirect heat-exchange therethrough and against an evaporative pressure of at least 20 kg./cm.$^2$ above atmospheric cannot be stressed too highly. We have indicated that it is crucial to maintain the aforementioned film, which is effectively a slag-containing siliceous substance, because this film promotes and controls the reactions and renders uniform the reaction producing the phosphorus pentoxide. Surprisingly, a uniform film of suitable wall coverage, viscosity and thickness can be maintained only if the wall is cooled by evaporation of water and only if the evaporation of water is against a superatmospheric pressure of 20 kg./cm.$^2$. The term "evaporative cooling" is used to describe the cooling of a surface which results when water in heat-conductive relationship thereto, but confined in a channel or chamber, is permitted to evaporate against a pressure which is maintained at 20 kg./cm.² above atmospheric or thereabove. The channel may be a tube coil wound around or embedded in the cyclone wall, or channels integrally and unitarily formed in the material of the wall. It is also important to note that the temperature minimum of 1500° C. is critical in the sense that lower temperatures appear to affect adversely not only the overall reaction but also the effectiveness of the film mentioned earlier.

We have mentioned that the reactants with which the phosphorus-containing raw materials are reacted may be carbonaceous and siliceous in character. In general the reactants may be of the type described in U.S. Pats. 1,630,283, 1,463,959 and 1,422,699 or German printed publication 1,150,959. The siliceous compounds are substances containing silicon, preferably in combination with oxygen, and thus include silicic acid, silicates and silica (sand) and compounds containing same or substances in which these compounds are incorporated mechanically or chemically. The carbonaceous materials may, of course, include carbon in any of the common forms, carbon compounds such as hydrocarbons and carbon-containing minerals such as powdered coal or coke, and also include any requisite fuel.

Surprisingly, the cyclone chamber of the present invention, which has an approximately horizontal axis, provides some surprising and unobvious results when compared with a cyclone chamber having a vertical axis and to which similar reactants are charged. It appears that an important distinction lies in that the molten materials, with the recumbent cyclone chamber of the present invention, have a long residence time in the reaction space whereas gravitational effects reduce the residence time beneath a practical minimum with conventional cyclone-type reactors having upright axes. The molten composition in the recumbent cyclone chamber is continuously in contact with the hot gases until the gases or the molten material is discharged. Since the gases and particles entrained thereby are introduced along a tangent or secant to the cyclone chamber of the present system, the reacting mixture is projected at relatively high velocities against the wall where they react at a gas/liquid interface, a solid/liquid interface or a ternary gas/solid/liquid interface with the film of molten materials. The gases and particles entrained thereby continue to move along helical paths to the outlet of the chamber.

The intense cooling of the cyclone walls of the system of the present invention, by evaporation of water under a pressure of at least 20 kg./cm.², gauge, results in the formation of a layer of solidified materials on the inner surface of the cyclone which layer is retained by pins mounted on the inner wall and projecting inwardly therefrom, a film of molten metal forming along the inner face of this solid lining. Since the molten material or liquid phase is of approximately the same composition as the underlying solid coating, there is a certain solubilization of the coating and solidification of the liquid phase, whereby, the solid coating is continuously renewed and any coating which is solubilized is rapidly replaced. The solidified material interposed between the liquid film and the wall of the recumbent cyclone chamber prevents acid attack by the acid gases in the reaction chamber upon the chamber walls and does not require special lining of the latter. Savings in capital and operational cost are thus achieved.

The starting materials to be reacted, according to the present invention, are preferably introduced into the recumbent cyclone chamber at a plurality of locations which may be spaced axially therealong. This allows the operation of the cyclone chamber to be adjusted readily to differences in the starting materials and permits the heat transfer capacity of the chamber to be adjusted accordingly. Preferably, any solids to be supplied, e.g. the phosphorus-containing materials, are ground to particle sizes of 0.1 to 5.0 mm. and are introduced tangentially or secantially into the reactor. When other solids are employed, they may be ground jointly with the phosphorus-containing materials and introduced jointly therewith into the reactor or alternatively, the solid carbon materials may be separately ground from the phosphorus-containing materials to a particle size of 0.1 to 0.5 mm. and introduced axially into the cyclone chamber at the head thereof while the phosphorus-containing materials are introduced tangentially or secantially. The latter terms describe a direction of flow of substances into the reaction chamber in a plane which is transverse to axis thereof and may be perpendicular. When the inlet lies in a plane perpendicular to the recumbent axis of the chamber, the axis of the inlet conduit may be precisely tangent to the inner wall of the chamber or to a circle centered on the axis thereof but lying in this plane. Where the infeed axis is tangential to such a circle, and the circle has a finite diameter less than that of the chamber wall, the material is said to be introduced along a secant. Thus the term "generally tangential" has been used to refer to both the tangential inflow and the secantial inflow.

The reactants, according to the present invention, include combustion-supporting gases which preferably have an oxygen content of at least 30% by volume, more advantageously between 40 and 60% by volume. We may use, for this purpose, high-oxygen gases if they are available from some supporting plant, although we may also employ a mixture of air and oxygen of commercial purity. The requisite oxygen can be obtained by introducing the oxygen and the air into the reaction chamber through separate inlets which may be in the same plane or in axially spaced planes. Incidentally, when the inlets opening tangentially or secantially into the reaction chamber lie in planes which are inclined to the reactor axis, the materials are fed positively toward the outlet of the chamber, thereby insuring a generally helical progression of the gases in that direction. Separate introduction of oxygen and air has been found to be particularly satisfactory where oxygen of 70% purity is available.

Preferably the parameters are adjusted so that a temperature is maintained in the cyclone chamber of 1700 to 2000° C. as measured at the axis. These temperatures have been found to provide a sufficiently high reaction rate and low viscosity slag. According to still another feature of the invention, the exhaust gases from the cyclone reactor having an approximately horizontal axis are cooled in a waste-heat boiler, preferably to a temperature below 400° C. but above the dewpoint of the gases which depends upon the phosphorus pentoxide ($P_2O_5$) concentration. These temperatures enable optimum processing of the gases.

The phosphorus pentoxide can be separated from the gas according to the present invention in any one of several ways, depending on the nature of the end product desired. If $P_2O_5$ is to be recovered directly from the process, it may be condensed from the gases in a water-cooled condenser. The exhaust gases must, in this case, be free from water vapor and the other parameters of the system must be adjusted accordingly. When $P_2O_5$ is to be recovered in an aqueous system as phosphorus acid or a phosphate, a wet separator such as a scrubber of the Venturi or Ströder type may be used. The nature of the absorbing solution will of course determine the final product. Aqueous solutions of sodium hydroxide or potassium hydroxide or ammonia (base) will yield the corresponding phosphates which will have acid to neutral properties.

The wet separation may be followed by a drying step, e.g. spray-drying, in which phosphoric acid with a concentration of almost 100% or solid phosphate satisfactory for fertilizer or chemical purposes, is recovered. Where the phosphates are supplied to the spray-drying apparatus, condensed phosphates may be obtained as the spray-dried product.

(6) DESCRIPTION OF THE DRAWING

The above and other objects, features and advantages of the present invention will become more readily apparent from the following description, reference being made to the accompanying drawing, in which:

FIG. 2 is a vertical cross-sectional view, partly in diagrammatic form of a portion of the apparatus of FIG. 2;

FIG. 3 is a detail cross-sectional perspective view of a portion of a cyclone chamber according to the present invention; and FIGS. 4 and 5 are diagrams illustrating different modes of introducing the reactants into the cyclone chamber of FIG. 1 or 2.

(7) SPECIFIC DESCRIPTION

Figure 1:
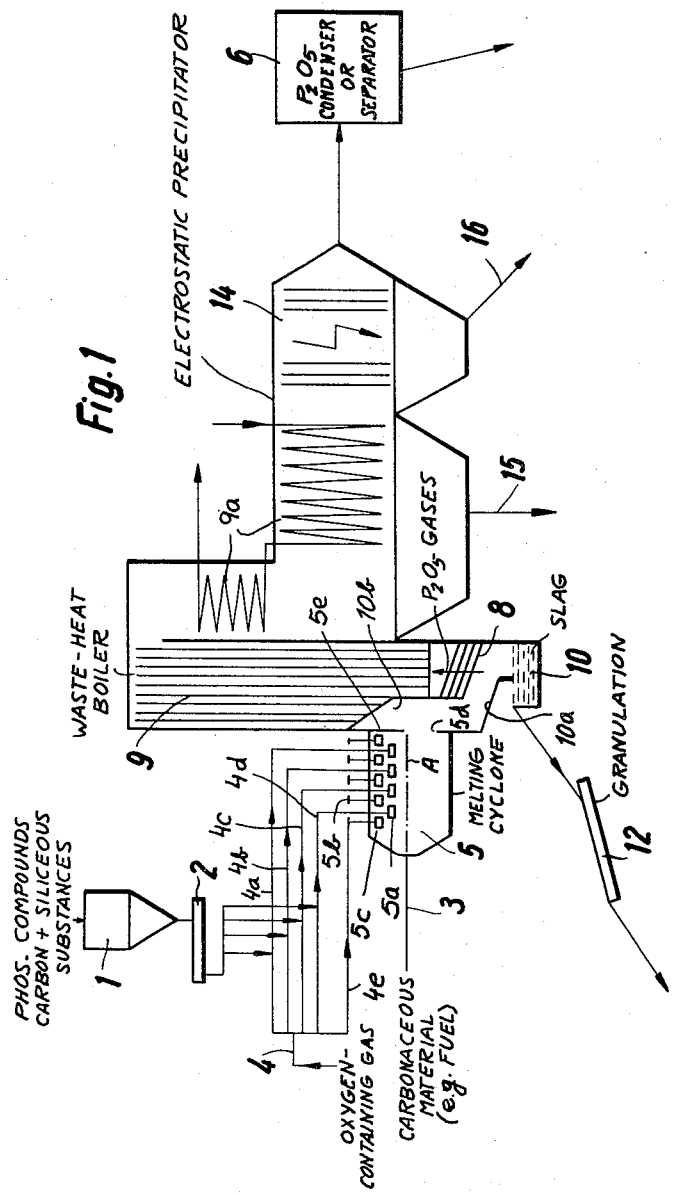
FIG. 1 is a flow diagram illustrating the process of the present invention.

In FIG. 1, we show in diagrammatic form, a plant for producing phosphorous pentoxide according to the present invention, the plant comprising a hopper 1 containing solid reactant components which may be ground and mixed together. These components may include carbonaceous and siliceous substances as well as phosphorous compounds, e.g. apatite minerals or phosphorus-containing metallurgical slags, ground in common to a particle size of 0.1 to 0.5 mm. A weighing belt conveyor 2 (see pp. 22-35 ff. of Perry's Chemical Engineers' Handbook, McGraw-Hill Book Co., New York, 1963) is provided to meter the solid reactants into a plurality of feed ducts 4a–4d communicating with respective tangential or secantial inlets 5a etc. of the melting cyclone 5. In addition, one or more ducts 4e may be provided to deliver oxygen-containing gas directly to a manifold 5b also communicating with tangential or secantial inlets 5c. The oxygen-containing gas is supplied by the feed conduit 4. The carbonaceous material and, if desired, some of the other reactive solids, may be inserted at the apex of the conical head of chamber 5 via a line 3 by blowing with an oxygen-containing or fuel gas. Additional fuel may be supplied at this location as well. The melting cyclone as shown in FIG. 1 has an axis A which is horizontal. Any additional substances (e.g. fuels or liquid carbonaceous components) are likewise introduced at the apex of the cyclone. The discharge side or mouth of the cyclone is provided with a weir 5d over which the slag may flow to a ramp 10a leading to a sump or hearth. From the latter, the slag may be trained intermittently to a granulating trough 12 which is operated in the usual manner.

The melt of the cyclone is also provided with a baffle 5e under which the gases must pass and which defines a deflection chamber 10b operating as an impingement baffle by which particles contained in the exhaust gas are in part extracted. The gas, passing beneath and around the baffle 10b rises through a collecting grate 8 and rises into a waste heat boiler 9. An electrostatic precipitator 14, downstream of a further heat exchanger 9a may be provided to remove solid particles which collect in the dust bins 15 and 16. The gases may then be introduced into a separator stage 6 in which the $P_2O_5$ is recovered by condensation or wet separation as originally described. As can be seen in FIG. 3, the inlets 5a etc. open tangentially along the inner wall 5' of the cyclone which may be provided with inwardly extending pegs 5" anchoring a solid film to the cyclone wall when the latter is cooled, as will be apparent in FIG. 2. FIGS. 4 and 5 show that the inlets 5a may be tangential to the inner wall 5' of the chamber or may lie, as shown at 5a, along a secant thereto.

From FIG. 2, it will be apparent that the entire cyclone chamber 5 is surrounded by a closely coiled tube 17 forming a heat exchanger and having an inlet 17a to which water is supplied by a pump 17b. The outlet side of the continuous heat exchanger 17 is provided with a pressure-relief valve 17c which controls the back pressure in the tube 17 to maintain a superatmospheric pressure of at least 20 kg./cm.² against which the water evaporates.

From FIG. 2 it will be apparent that the weir 5d forms a narrow outlet slot 13 with an internal collar 13a forming the gas outlet duct or baffle 5e previously described. The duct 13a extends into the reaction chamber and widens outwardly toward the mouth, while being cooled by the tubes 17. In this embodiment, moreover, it will be apparent that the axis B includes an angle β with a horizontal H which may range up to 15°. The wall 10b is likewise provided with heat exchange tubes 17 and with a chamber 18 communicating with the tubular grate 8 at one side thereof as a fluid manifold. A similar manifold 8a is provided on the opposite side. The grate tubes 8 are thereby cooled to condense any slag vapor and mechanically trapped by surface action, any droplets entrained by the gases passing under the baffle 10b.

(8) SPECIFIC EXAMPLES

Example 1

6.8 metric tons apatite, 3.4 metric tons silicic acid and 1.3 metric tons coke are fed per hour from a feed bin 1 through conduits 4 and charged in a uniform distribution in the directions of the secants and tangents. The starting materials were previously ground to particle sizes of 0.1–0.5 millimeter and thoroughly mixed and dried. The cyclone chamber 5 was additionally heated with 0.6 metric ton of fuel oil per hour. The total rate of oxygen required to carry out the process was 4.8 metric tons per hour.

The temperature near the cyclone axis was about 1800° C. The walls of the cyclone were cooled by an evaporation of water under a pressure of 40 kilograms per square centimeter above atmospheric pressure. This corresponds to a wall temperature of about 250° C.

The resulting gaseous reaction products were cooled to about 380° C. in the waste heat boiler 9 and entrained flue dust is then removed from the gaseous reaction products in an electrostatic precipitator 14.

2.3 metric tons $P_2O_5$ per hour were recovered by condensation on cooling surfaces.

Example 2

The $P_2O_5$-containing gas, which has been recovered in accordance with Example 1 and cooled to about 380° C., is converted directly to ammonium phosphate without intervening separation or recovery. For this purpose, an ammonia solution is sprayed from a two-component nozzle using the $P_2O_5$-containing gas as the atomizing fluid, into a drying tower. In the drying tower, the droplets of the ammonium phosphate solution pass in uniflow with the hot gases at a temperature of 350 to 280° C. and 3.7 metric tons per hour of primary ammonium phosphate is recovered.

Example 3

The $P_2O_5$-containing gas, produced in Example 1, is cooled to a temperature of about 380° C., is directly converted to sodium polyphosphate. To this end, the gas is introduced into a Venturi washer with a 20% sodium hydroxide solution which is supplied in an amount of 2.16 metric tons per hour (calculated as NaOH. The resulting solution contains primary and secondary sodium orthophosphate in a molar ratio of 1:2 and is sprayed into a drying tower for uniflow with hot gases at a temperature of about 350° C. The resulting product is about 3.97 tons per hour of sodium polyphosphate.

We claim:

1. A process for recovering phosphorus pentoxide from a phosphorus-containing raw material, comprising the steps of:
   entraining said phosphorus-containing raw material in an oxygen-containing gas stream generally tangentially into a reaction cyclone having a generally cylindrical wall with an axis including an angle of 0° to 30° with the horizontal in the presence of carbonaceous and siliceous substances;
   reacting said carbonaceous and siliceous substances with said raw material in said cyclone at a temperature of at least 1500° C. to produce a liquid slag and a gas stream containing phosphorus pentoxide;

cooling the cyclone wall substantially over the length and circumference thereof by evaporating water on said heat transfer therethrough against a superatmospheric pressure of at least 20 kg./cm.$^2$;

separating said produced gas stream from said slag; and removing phosphorus pentoxide from the separated gas stream.

2. The process defined in claim 1, further comprising introducing said raw material and said carbonaceous and siliceous substances to said cyclone at locations axially spaced therealong.

3. The process defined in claim 1, further comprising the step of mixing said raw material with at least one of said carbonaceous and siliceous substances prior to introducing said raw material into said cyclone.

4. The process defined in claim 1, further comprising the step of grinding said raw material to a particle size of 0.1 to 0.5 mm. prior to introducing it into said cyclone.

5. The process defined in claim 1, further comprising the step of grinding at least one of said carbonaceous and siliceous substances to a particle size of 0.1 to 0.5 mm. prior to introducing it into said cyclone.

6. The process defined in claim 1 wherein said oxygen-containing gas contains at least 30% by volume oxygen.

7. The process defined in claim 6 wherein said oxygen-containing gas contains 40% to 60% oxygen by volume.

8. The process defined in claim 1 wherein said temperature is maintained between substantially 1700° and 2000° C. in the region of said axis.

9. The process defined in claim 1, further comprising the step of withdrawing produced said gas stream from said cyclone; and cooling the withdrawn gas to a temperature below 400° C. but above the dewpoint of this gas.

10. The process defined in claim 9, further comprising the step of absorbing phosphorus pentoxide from the cooled gas with an aqueous absorbent solution of sodium hydroxide, potassium hydroxide or ammonia.

11. The process defined in claim 10, further comprising the step of spray-drying said solution to recover a phosphorus compound.

12. The process defined in claim 1, further comprising the step of condensing phosphorus pentoxide from said produced gas stream.

References Cited

UNITED STATES PATENTS

| | | | |
|---|---|---|---|
| 3,479,138 | 11/1969 | Saeman | 423—311 |
| 3,591,336 | 7/1971 | Saeman | 423—304 |
| 3,134,644 | 5/1964 | Shaffery et al. | 423—316 |

FOREIGN PATENTS

| | | | |
|---|---|---|---|
| 199,114 | 8/1967 | U.S.S.R. | 23—165 A |

EDWARD J. MEROS, Primary Examiner

G. A. HELLER, Assistant Examiner

U.S. Cl. X.R.

423—179, 312, 322